(12) United States Patent
Anton

(10) Patent No.: US 8,855,224 B2
(45) Date of Patent: Oct. 7, 2014

(54) RECEIVER AND METHOD OF RECEIVING SIGNAL FOR REDUCING INTERSYMBOL INTERFERENCE

(75) Inventor: Laktyushkin Anton, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 170 days.

(21) Appl. No.: 13/534,117

(22) Filed: Jun. 27, 2012

(65) Prior Publication Data

US 2012/0327992 A1 Dec. 27, 2012

(30) Foreign Application Priority Data

Jun. 27, 2011 (KR) ........................ 10-2011-0062449

(51) Int. Cl.
*H04K 1/10* (2006.01)
*H04L 27/26* (2006.01)
*H04L 7/033* (2006.01)

(52) U.S. Cl.
CPC ........ *H04L 27/2665* (2013.01); *H04L 27/2675* (2013.01); *H04L 7/0332* (2013.01); *H04L 27/2671* (2013.01); *H04L 27/2691* (2013.01)
USPC ........................................................ 375/260

(58) Field of Classification Search
None
See application file for complete search history.

(56) References Cited

U.S. PATENT DOCUMENTS

| | | | | |
|---|---|---|---|---|
| 5,732,113 A * | 3/1998 | Schmidl et al. | ............... | 375/355 |
| 6,470,030 B1 * | 10/2002 | Park et al. | ..................... | 370/480 |
| 7,027,540 B2 * | 4/2006 | Wilson et al. | ................. | 375/354 |
| 7,039,000 B2 * | 5/2006 | You et al. | ..................... | 370/203 |
| 7,139,338 B2 * | 11/2006 | Wilson et al. | ................. | 375/343 |
| 7,177,376 B2 * | 2/2007 | Atungsiri et al. | ............. | 375/343 |
| 7,251,282 B2 * | 7/2007 | Maltsev et al. | ............... | 375/260 |
| 7,548,506 B2 * | 6/2009 | Ma et al. | ...................... | 370/208 |
| 7,577,087 B2 | 8/2009 | Palin | | |
| 7,627,059 B2 * | 12/2009 | Niu et al. | ..................... | 375/324 |
| 7,809,097 B2 * | 10/2010 | Wang et al. | ................... | 375/355 |
| 8,018,975 B2 * | 9/2011 | Ma et al. | ...................... | 370/509 |
| 8,335,283 B1 * | 12/2012 | Sun | .............................. | 375/343 |
| 8,340,234 B1 * | 12/2012 | Cheng et al. | .................. | 375/348 |
| 8,537,931 B2 * | 9/2013 | Park et al. | ..................... | 375/316 |
| 2006/0018413 A1 * | 1/2006 | Gupta | .......................... | 375/343 |
| 2007/0086329 A1 * | 4/2007 | Glazko et al. | ................ | 370/208 |
| 2007/0201423 A1 | 8/2007 | Laroia et al. | | |
| 2009/0220015 A1 | 9/2009 | Fu et al. | | |
| 2010/0135447 A1 * | 6/2010 | Sapozhnykov et al. | ....... | 375/362 |
| 2012/0201332 A1 * | 8/2012 | Vapillon et al. | ............... | 375/340 |
| 2013/0136198 A1 * | 5/2013 | Chavali et al. | ................ | 375/260 |

* cited by examiner

*Primary Examiner* — Chieh M Fan
*Assistant Examiner* — Bahman Badipour
(74) *Attorney, Agent, or Firm* — Volentine & Whitt, PLLC

(57) ABSTRACT

A synchronization method for a receiver includes generating, by a beacon detector, an operating signal by performing a logic operation on a baseband signal, and calculating, by a coarse sync block, a coarse FFT window start position value where a signal-to-noise ratio becomes maximized by estimating a noise level of the operating signal.

15 Claims, 14 Drawing Sheets

RECEIVER AND METHOD OF RECEIVING SIGNAL FOR REDUCING INTERSYMBOL INTERFERENCE

CROSS-REFERENCE TO RELATED APPLICATIONS

This application claims priority under 35 U.S.C. §119(a) from Korean Patent Application No. 10-2011-0062449, filed on Jun. 27, 2011, the disclosure of which is hereby incorporated herein by reference in its entirety as if fully set forth herein.

BACKGROUND

Embodiments of the present inventive concept relate to a receiver and a method of receiving a signal, and more particularly, to a receiver and a method of receiving a signal which may minimize inter-symbol interference (ISI).

In most cities and many suburban areas, one of the main obstacles to efficient and reliable wireless communication is multipath signal propagation, which may be produced when a signal travels along different paths from the transmitter to the receiver. The multipath signal propagation may lead to inter-symbol interference (ISI). ISI is a type of distortion of a signal where one symbol interferes with one or more symbols.

SUMMARY

One aspect of the inventive concepts is directed to a method of synchronizing a receiver, including generating, by a beacon detector, an operating signal by performing a logic operation on a baseband signal, and estimating, by a coarse sync block, a noise level of the operating signal and calculating a coarse fast Fourier transform (FFT) window start position value where a signal-to-noise ratio becomes maximized according to an estimation result.

According to an example embodiment, the method may further include calculating, by a channel impulse response block, a channel impulse response signal by receiving a sync symbol of the baseband signal, and estimating, by a fine sync block, a channel delimiter value based on the channel impulse response signal and calculating a fine FFT window start position value by using the estimated channel delimiter value.

The step of calculating the coarse FFT window start position value includes estimating the noise level of the operating signal, comparing the operating signal with the estimated noise level, and calculating the coarse FFT window start position value according to the comparison result.

According to an example embodiment, calculating the coarse FFT window start position value may further include waiting until receiving a sync trigger signal from the beacon detector, waiting during a first guard interval before estimating the noise level of the operating signal, and waiting during a second guard interval after estimating the noise level of the operating signal.

The noise level is calculated by, $$Snoise = \frac{1}{Nnoise}\sum ry(n),$$

wherein Snoise indicates the noise level, Nnoise indicates the number of samples and ry(n) indicates the operating signal, respectively.

The coarse FFT window start position value is calculated by $$nopt = \frac{\sum nry(n)}{ry(n)},$$

wherein nopt is the coarse FFT window start position value, n is an integer, and ry(n) is the operating signal, respectively.

According to an example embodiment, calculating the fine FFT window start position value further includes receiving the channel impulse response signal and calculating an updated channel impulse response signal by $$\bar{c}(n) = c(n), |c(n)|^2 > \frac{4}{2048}\sum_{k=0}^{2047}|c(k)|^2,$$

$$0, \text{otherwise}$$

where $\bar{c}(n)$ is an updated channel impulse response signal, c(n) is the channel impulse response signal. k is an integer, respectively.

The channel delimiter value is calculated by $$\left|\sum_{n=0}^{2047}|\bar{c}(n)|^2 n - 2048\sum_{n=ny+1}^{2047}|\bar{c}(n)|^2\right|,$$

wherein ny indicates the channel delimiter value, the equation is minimized by ny, $\bar{c}(n)$ indicates the updated channel impulse response signal, and, n indicates an integer, respectively.

The fine FFT window start position value dy is calculated by $$\sum_{n=ny}^{dy+ny}|\bar{c}(n\bmod 2048)|^2 = \sum_{n=ny+dy+512}^{2047+ny}|\bar{c}(n\bmod 2048)|^2,$$

wherein dy indicates the fine FFT window start position value, ny indicates the channel delimiter value, n indicates an integer and mod 2048 indicates a modulo operation with a modulus of 2048, respectively.

According to an example embodiment, the step of calculating fine FFT window start position value may include searching for a last echo position index and calculating a channel profile length according to the last echo position index.

Another aspect of the inventive concepts is directed to a receiver, including a front end converting a wireless signal into a baseband signal, a beacon detector generating an operating signal by performing a logic operation on the baseband signal, a coarse sync block estimating a noise level of the operating signal and calculating a coarse FFT window start position value where a signal-to-noise ratio is maximized according to an estimation result, and a FFT block converting the baseband signal into a frequency domain signal by using the FFT window start position.

According to an example embodiment, the receiver may further include a channel impulse response block calculating a channel impulse response signal by receiving a sync symbol of the baseband signal, and a fine sync block estimating a channel delimiter value in response to the channel impulse response signal and calculating a fine FFT window start position value based on the estimated channel delimiter value.

The coarse sync block includes an accumulator, which performs an accumulation operation by receiving the operating signal and estimates the noise level according to an accumulation operation performance result, a comparator comparing the operating signal with the noise level and outputting a comparison signal, a divider calculating the coarse FFT window start position value where a signal to noise ratio is maximized by using the noise level of the operating signal, and a controller controlling the accumulator and the divider in response to the comparison signal.

The fine sync block includes a channel delimiter searching block searching for the channel delimiter value based on the channel impulse response signal and a fine FFD window start position searching block calculating the fine FFT window start position value by using the channel delimiter value.

According to an example embodiment, the fine sync block may further include a thresholding block outputting an updated channel impulse response signal by receiving the channel impulse response signal.

Yet another aspect of the inventive concepts is directed to a device, comprising: a receiver front end configured to receive a wireless signal and to output a baseband signal; a Fast Fourier Transformer configured to perform a Fast Fourier Transform (FFT) on the baseband signal; and a timing synchronization unit configured to receive the baseband signal and in response thereto to supply an FFT window start position to the Fast Fourier Transformer. The timing synchronization unit is configured: to detect one or more sync symbols in the baseband signal and in response thereto to generate a sync trigger signal and an operating signal, to estimate a noise level of the operating signal and in response thereto to calculate a coarse FFT window start position value, to generate a channel impulse response signal in response to the baseband signal, wherein the channel impulse response signal corresponds to an impulse response of a channel by which the wireless signal is transmitted to the device, to determine a channel delimiter value in response to the channel impulse response signal, to calculate a fine FFT window start position value from the channel impulse response signal, and to adjust the course FFT window start position value with the fine FFT window start position value to determine the FFT window start position.

According to an example embodiment, the timing synchronization unit includes a beacon detector configured to detect the sync symbol in the baseband signal and in response thereto to generate the sync trigger signal and the operating signal.

According to an example embodiment, the timing synchronization unit includes a channel impulse response (CIR) unit configured to generate the channel impulse response signal in response to the baseband signal. The CIR unit comprises: an FFT unit configured to perform an FFT on the one or more sync symbols of the baseband signal at the coarse FFT window start position value to generate a first frequency domain signal; a multiplier configured to multiply the frequency domain signal by a reference signal to generate a second frequency domain signal; and an inverse FFT unit configured to perform an inverse FFT on the second frequency domain signal to produce the channel impulse response signal.

According to an example embodiment, the timing synchronization unit includes a coarse sync block. The coarse sync block is configured: to estimate a noise level of the operating signal; to compare the operating signal with the estimated noise level; and to calculate the coarse FFT window start position value according to a result of the comparison of the operating signal and the estimated noise level.

According to an example embodiment, the coarse sync block is configured to calculate the coarse FFT window start position value where a signal-to-noise ratio of the baseband signal is maximized.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
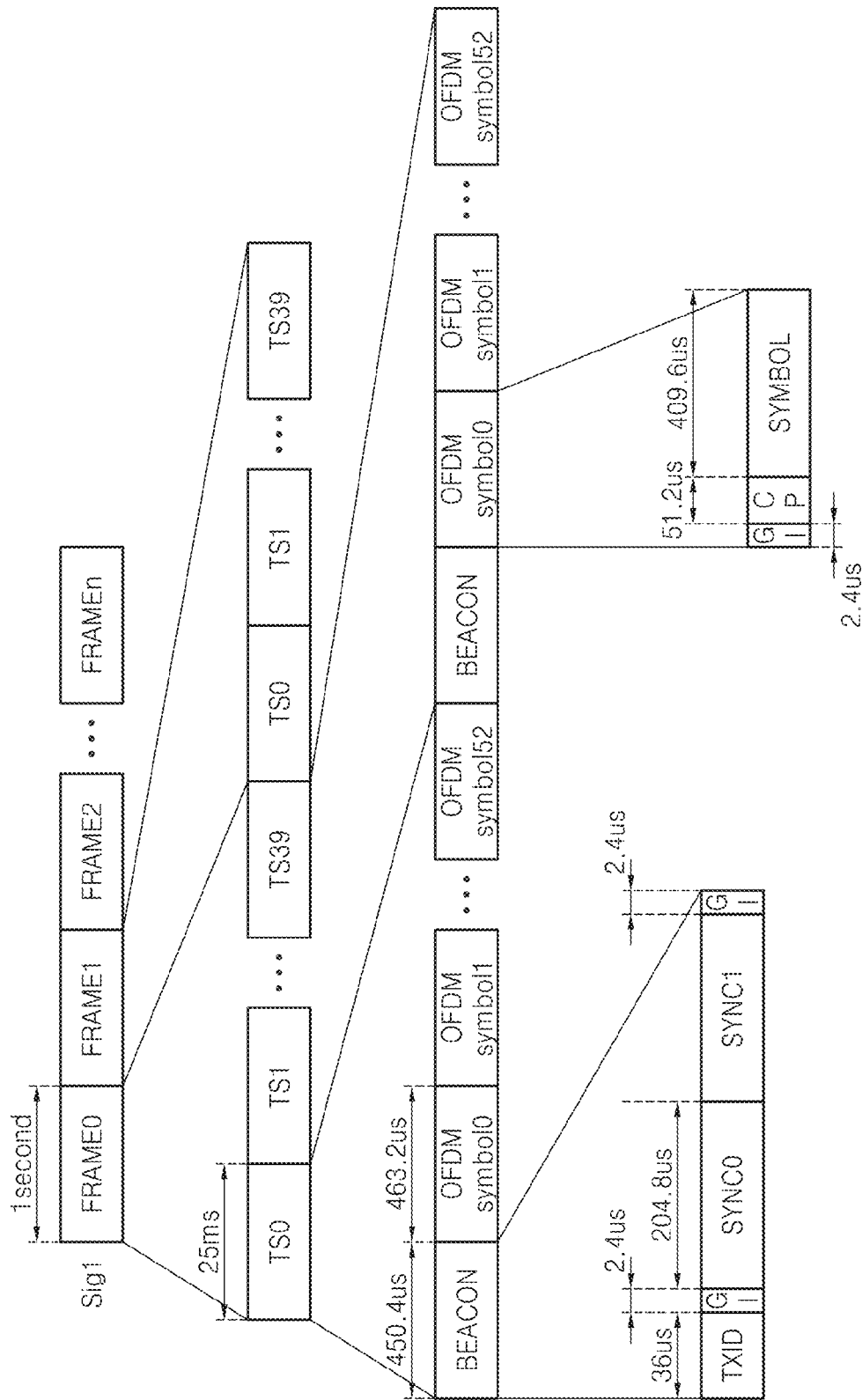
FIG. 1 illustrates a structure of a signal output from a transmitter according to an example embodiment of the inventive concepts.

The present inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein. FIG. 1 illustrates a structure of a signal output from a transmitter according to an example embodiment of the inventive concepts, and FIG. 2 is a diagram of a communication system according to an example embodiment of the inventive concepts.

Figure 2:
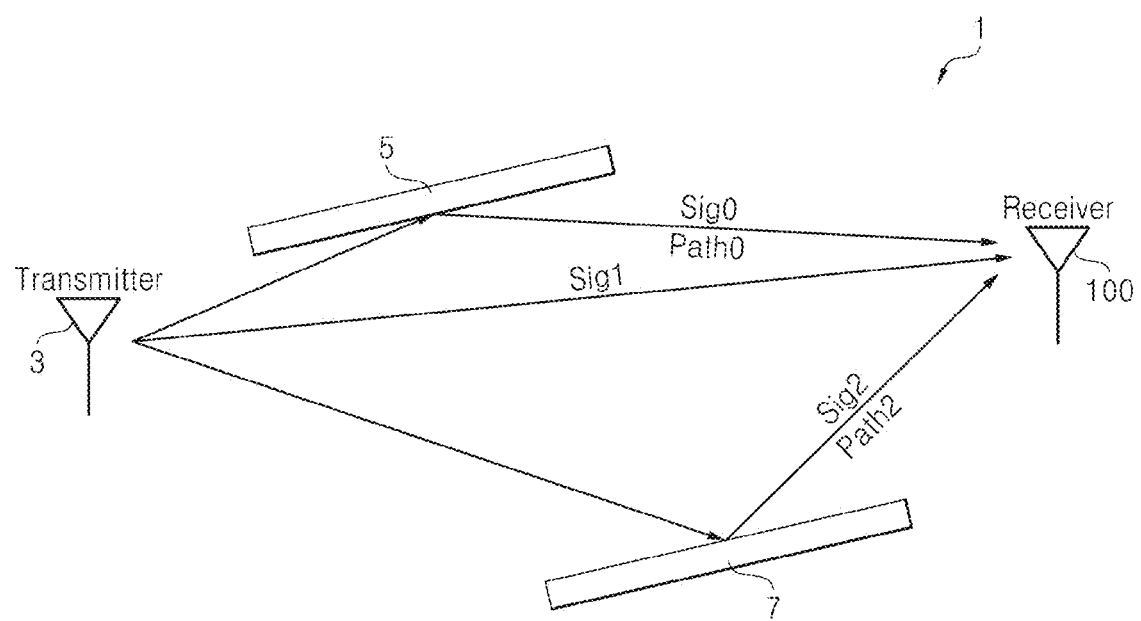
FIG. 2 is a diagram of a communication system according to an example embodiment of the inventive concepts.

Referring to FIGS. 1 and 2, a communication system 1 includes a transmitter 3 and a receiver 100.

Transmitter 3 transmits a signal Sig1 including a plurality of frames FRAME0, FRAME1, . . . and FRAMEn to receiver 100. The duration of each of the plurality of frames FRAME0, FRAME1, . . . and FRAMEn may be a second.

Each of the plurality of frames FRAME0, FRAME1, . . . and FRAMEn includes a plurality of time slots. For example, a frame FRAME0 may include 40 time slots TS0, TS1, . . . and TS39.

In one or more embodiments, each period of the plurality of time slots may be 25 ms. Each of the plurality of time slots TS0, TS1, . . . and TS39 includes a beacon BEACON and a plurality of OFDM symbols, e.g., OFDM symbol0, OFDM symbol1, . . . and OFDM symbol 52.

In one or more embodiments, a period of a beacon BEACON may be 450.4 µs and each of the plurality of OFDM symbols, e.g., OFDM symbol0, OFDM symbol1, . . . and OFDM symbol52, may be 463.2 µs. The beacon BEACON may include an ID (TXID) of the transmitter 3, two guard intervals (GI), and two sync symbols SYNC0 and SYNC1.

In one or more embodiments, a period of the ID (TXID) of the transmitter 3 may be 36 µs, each period of two guard intervals GI may be 2.4 µs, and each period of two sync symbols SYNC0 and SYNC1 may be 204.8 µs. An OFDM symbol (OFDM symbol0) includes a guard interval GI, a cyclic prefix CP, and a symbol SYMBOL. In one or more embodiments, a period of the guard interval GI may be 2.4 µs, a period of the cyclic prefix CP may be 51.2 µs, and a period of the symbol SYMBOL may be 409.6 µs.

When the transmitter 3 transmits a signal Sig1 to the receiver 100, there may occur a propagation phenomenon wherein at least one signal Sig0 or Sig2 reaches the receiver 100 through at least more than one path Path0 or Path2. The propagation phenomenon is also called multipath propagation. At least one signal Sig0 or Sig2 is a signal reflected by at least one obstacle 5 or 7.

Figure 3:
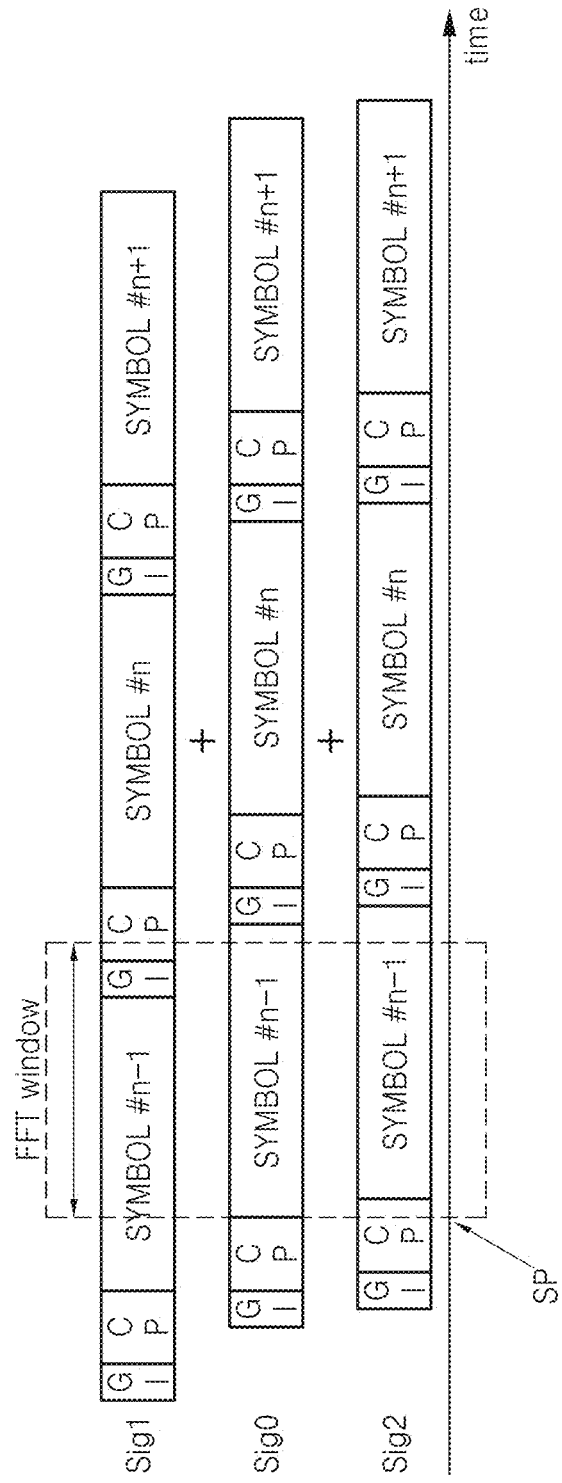
FIG. 3 illustrates a structure of a signal output from a receiver illustrated in FIG. 2.

FIG. 3 illustrates a structure of a signal output from the receiver illustrated in FIG. 2. Referring to FIGS. 1 to 3, when a fast Fourier transform (FFT) operation is performed by using a FFT window, inter-symbol interference (ISI) may occur due to the multipath propagation.

For example, when the fast Fourier transform (FFT) operation is performed at a FFT window start position (SP), there may occur ISI between a part of GI and CP of signal Sig1 and a symbol (SYMBOL#n-1) of signal Sig0. Therefore, the receiver 100 should be synchronized to minimize the ISI. That is, the receiver 100 should select an appropriate FFT window start position (SP).

Figure 4:
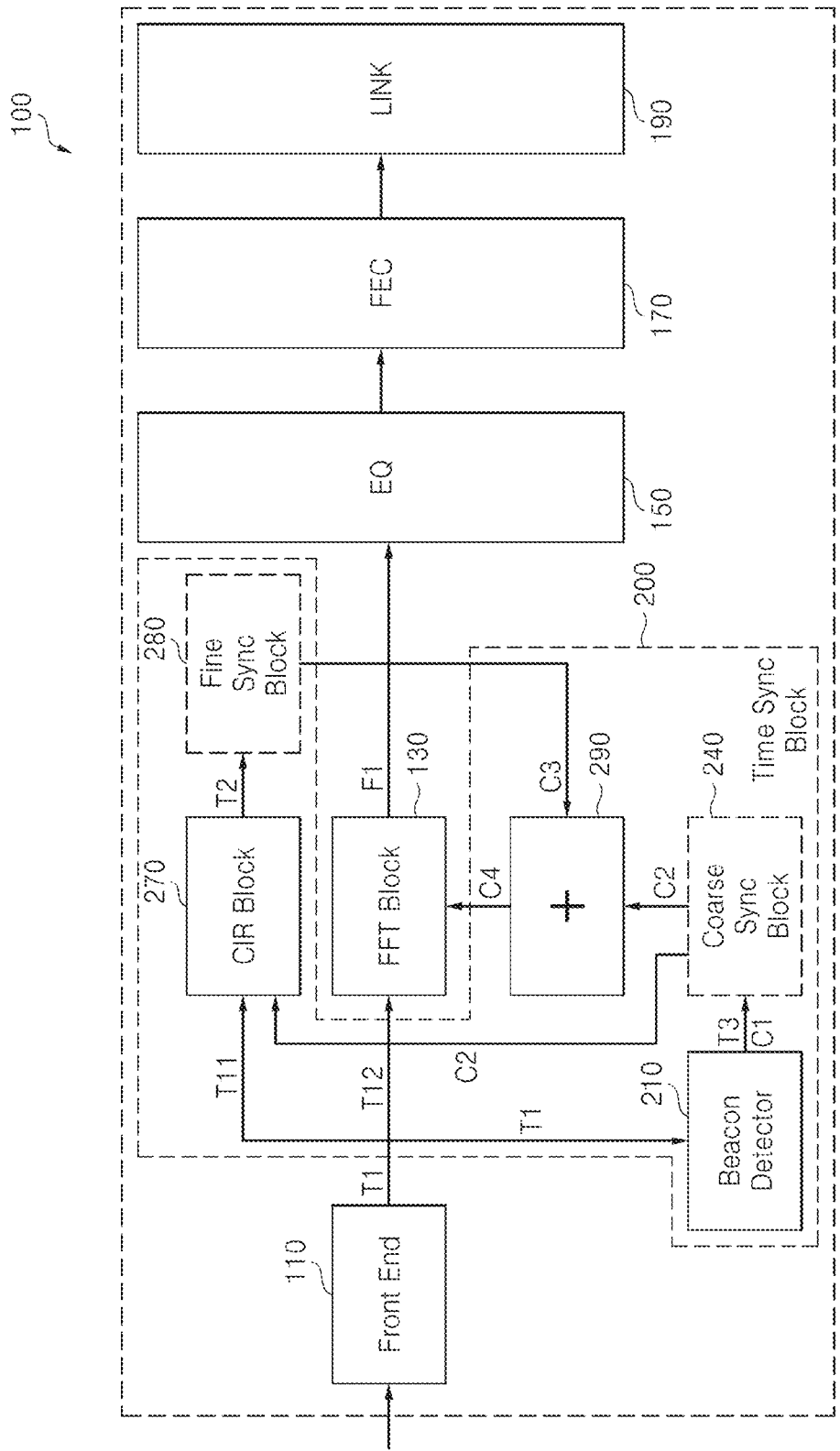
FIG. 4 is a block diagram of the receiver illustrated in FIG. 2.

FIG. 4 is a block diagram of the receiver illustrated in FIG. 2. Referring to FIGS. 1 to 4, receiver 100 includes a front end 110, a timing synchronization block or unit 200, a fast Fourier transform (FFT) block or unit 130, an equalizer 150, a forward error correction unit (FEC) 170 and a link 190.

Front end 110 converts a radio frequency (RF) or microwave wireless signal received from transmitter 3 into an intermediate frequency signal, and converts the intermediate frequency signal into a baseband signal T1.

For example, front end 110 may include an antenna (not shown), an impedance matching circuit (not shown) for matching an impedance of the antenna and an input impedance of subsequent circuitry (e.g., a front end filter or amplifier) in receiver 100, a front-end filter (e.g., a bandpass filter) (not shown) for decreasing input noise and an image frequency response, an amplifier (not shown) for increasing the sensitivity of receiver 100, and a mixer for converting a radio frequency signal received from transmitter 3 into an intermediate frequency (IF) signal. The amplifier may also be called a low-noise amplifier (LNA). According to various embodiments, the configuration of front end 110 may be varied (for example, in some embodiments the IF conversion process may be eliminated and the wireless signal may be directly converted to a baseband signal).

The baseband signal T1 includes sync symbols T11 and OFDM symbols T12. For example, the sync symbols T11 means the sync symbols SYNC0 and SYNC1 illustrated in FIG. 1, and the OFDM symbols T12 mean the OFDM symbols (OFDM symbol0, OFDM symbol1, . . . and OFDM symbol52) illustrated in FIG. 1.

Timing synchronization block 200 performs a coarse synchronization operation and a fine synchronization operation by receiving a baseband signal T1 and outputs a FFT window start position C4. The timing synchronization block 200 includes a beacon detector 210, a coarse sync unit or block 240, a channel impulse response (CIR) unit or block 270, a fine sync unit or block 280, and an adder 290.

Each component of the timing synchronization block 200 is explained referring to FIGS. 5 to 12.

The FFT block 130 converts a time-domain signal into a frequency-domain signal by using a FFT window at a FFT window start position C4.

The time-domain signal indicates OFDM symbols (T12) in a time domain representation of the baseband signal T1, and the frequency-domain signal indicates OFDM symbols (F1) in a frequency domain representation of the baseband signal T1.

Equalizer 150 corrects channel fluctuations by receiving OFDM symbols F1 in the frequency domain, and cancels inter-symbol interference. Forward error correction unit (FEC) 170 senses and corrects an error included in a signal output from equalizer 150. Link 190 is used to control an operation of receiver 100. For example, link 190 samples data, e.g., MPEG stream, from binary data output from FEC 170.

Figure 5:
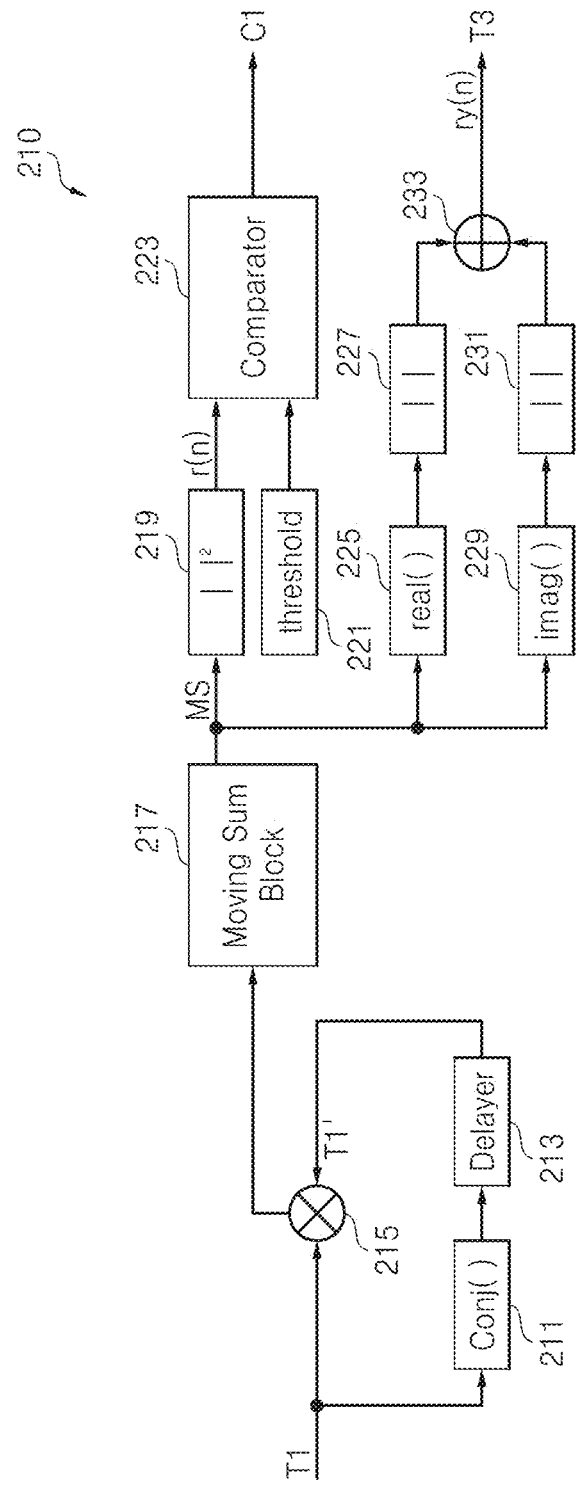
FIG. 5 is a block diagram of an example embodiment of the beacon detector illustrated in FIG. 4.

FIG. 5 is a block diagram of an embodiment of beacon detector 210 illustrated in FIG. 4. Referring to FIGS. 1 to 5, beacon detector 210 generates an operating signal ry(n) by performing a logic operation on the baseband signal T1.

Beacon detector 210 includes a conjugator 211, a delayer 213, a multiplier 215, a moving sum block 217, an absolute function calculator 219, a comparator 223, a real number operator 225, an imaginary number operator 229, a plurality of absolute function calculators 227 and 231, and an adder 233. Each component 211 to 233 may be embodied in a circuit, logic, or a combination thereof. The conjugator 211 conjugates a baseband signal T1. The delayer 213 delays the conjugated baseband signal for a plurality of samples and outputs a conjugated and delayed baseband signal T1'.

Multiplier 215 performs a multiplication operation on the conjugated and delayed baseband signal T1' and the baseband signal T1.

Moving sum block 217 calculates a moving sum on a signal output from mixer 215. A signal MS output from moving sum block 217 is expressed as a complex number. Absolute function calculator 219 adds a value which is the square of a real number part of the signal MS and a value which is the square of an imaginary number part of the signal MS. Comparator 223 compares an absolute value r(n) output from absolute function calculator 219 with a threshold value 221 and determines if a sync symbol SYNC0 or SYNC1 is triggered according to a result of the comparison.

When the absolute value r(n) is greater than threshold value 221, comparator 223 determines that the sync symbol SYNC0 or SYNC1 is triggered. When the sync symbol SYNC0 or SYNC1 is triggered, comparator 223 outputs a sync trigger signal C1 having a high logic state.

Real number operator 225 samples a real number part of a signal MS output from moving sum block 217 and absolute function calculator 227 calculates an absolute value of the real number part sampled by real number operator 225. Imaginary number operator 229 samples an imaginary number part of the signal MS output from moving sum block 217 and absolute function calculator 231 calculates an absolute value of the imaginary number part sampled by imaginary number operator 229.

Adder 233 outputs an operating signal ry(n) by adding a value output from absolute function calculator 227 and absolute function calculator 231. The signal ry(n) and the signal T3 are the same signal.

Figure 6:
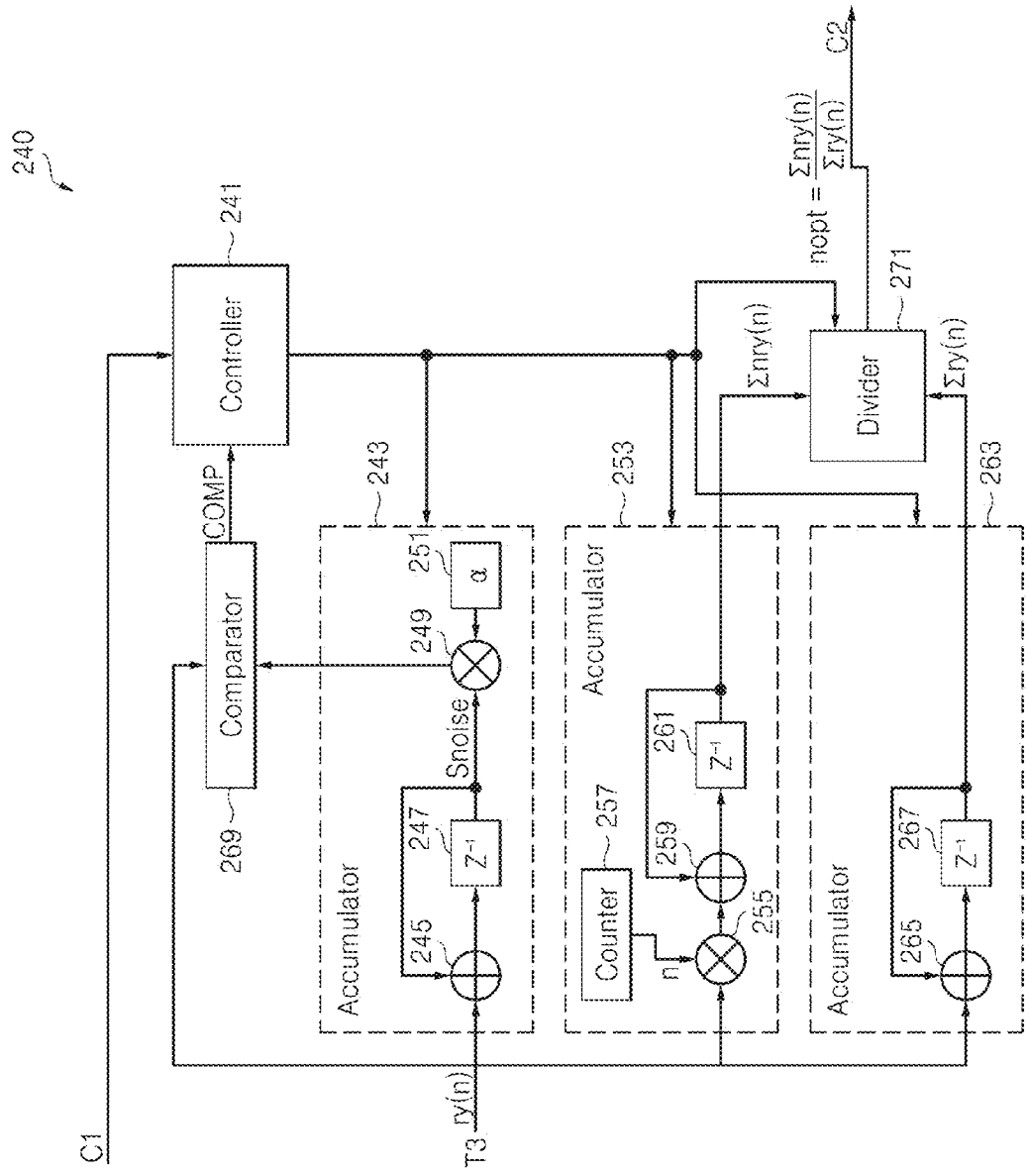
FIG. 6 is a block diagram of a coarse sync block illustrated in FIG. 4.
Figure 7:
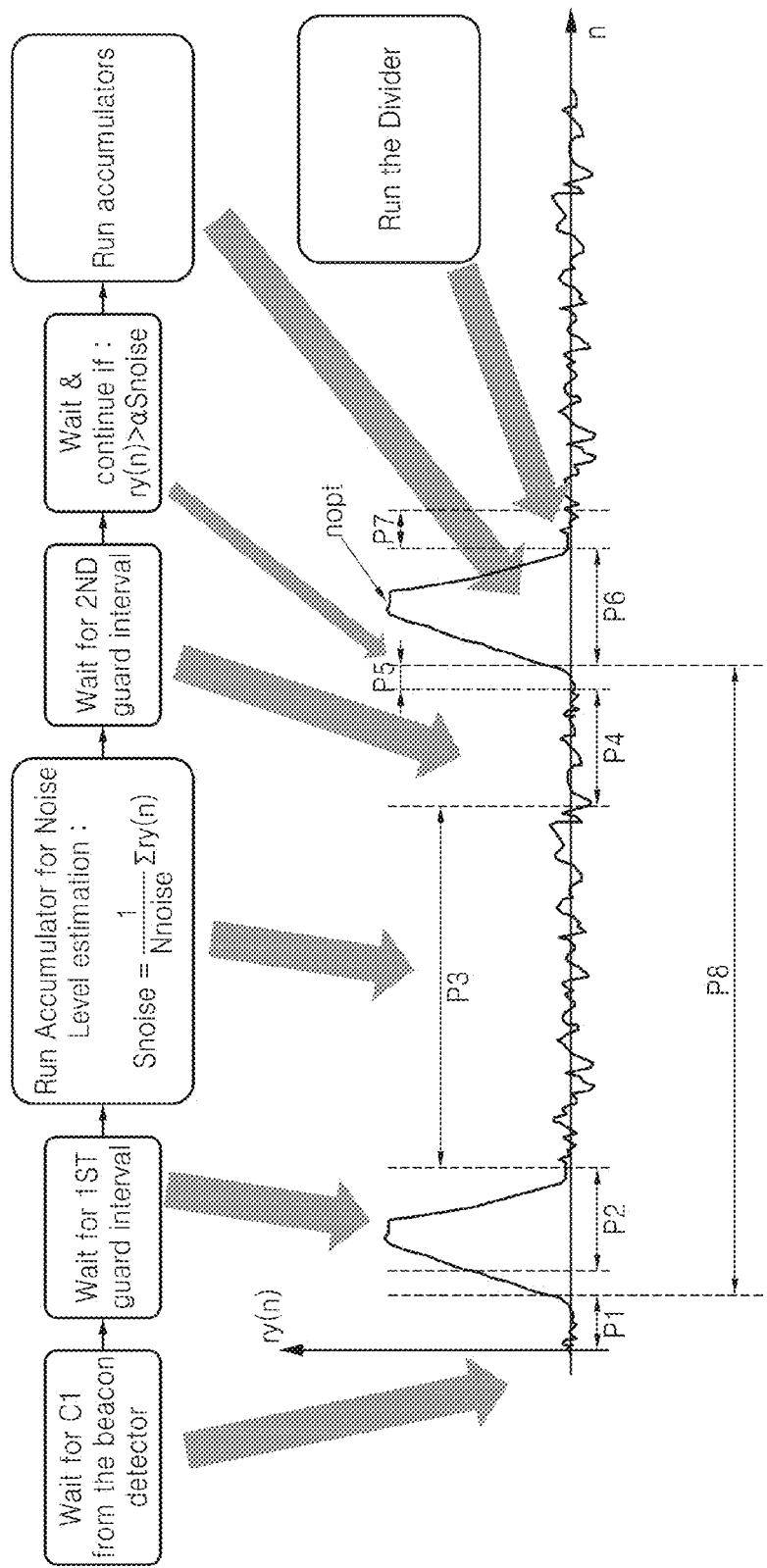
FIG. 7 is a diagram for explaining an operation of the coarse sync block illustrated in FIG. 4.

FIG. 6 is a block diagram of an embodiment of coarse sync block 240 illustrated in FIG. 4, and FIG. 7 is a diagram for explaining an operation of coarse sync blockv240 illustrated in FIG. 4. Referring to FIGS. 1 to 7, coarse sync block 240 estimates a noise level of an operating signal ry(n) and calculates a coarse FFT window start position value (nopt=C2) where the signal to noise ratio becomes maximized.

Coarse sync block 240 includes a controller 241, a first accumulator 243, a comparator 269, a second accumulator 253, a third accumulator 263 and a divider 271.

Controller 241 controls each of the plurality of accumulators 243, 253 and 263 and divider 271 in response to a sync trigger signal C1 and a comparison signal COMP. Controller 241 waits until the sync trigger signal C1 goes high P1. Controller 241 waits during a first guard interval P2 when the sync trigger signal C1 is high. Controller 241 waits during the first guard interval P2 and controls first accumulator 243 for a noise level estimation (Snoise).

First accumulator 243 performs an accumulation operation by receiving an operating signal (T3=ry(n)) and estimates a noise level (Snoise) according to a performance result under a control of controller 241 during a noise level estimation interval P3. First accumulator 243 includes an adder 245, a delay unit 247 and a multiplier 249. Adder 245 outputs a noise level by adding an operating signal ry(n) and a delay signal delayed by delay unit 247, and delay unit 247 outputs a delayed noise level (Snoise) by delaying a noise level output from adder 245. The delayed noise level (Snoise) may be indicated as shown in Equation 1.

$$Snoise = \frac{1}{Nnoise}\sum ry(n) \quad \text{[Equation 1]}$$

Here, Nnoise is the number of samples and ry(n) is the operating signal.

Multiplier 249 multiplies the delayed noise level (Snoise) with a value alpha (α) 251 to produce a scaled noise level α*Snoise. The value alpha 251 corresponds to a false alarm probability. For example, the value alpha 251 may have a fixed range, e.g., a range between 8 and 16.

After first accumulator 243 estimates a noise level (Snoise), controller 241 waits during a second guard interval P4. After controller 241 waits during the second guard interval P4, comparator 269 compares the scaled noise level (α*Snoise) with an operating signal ry(n) under control of controller 241. The comparison operation is performed in an interval P5.

This comparison may be expressed as shown in Equation 2.

$$DELTA = sng(ry(n) - \alpha*Snoise)$$

Here, ry(n) indicates an operating signal, a indicates a false alarm probability, and Snoise indicates a noise level, respectively.

Comparator 269 outputs a comparison signal COMP having a high level when the operating signal ry(n) is greater than the scaled noise level (α*Snoise) (i.e., DELTA=1). Controller 241 controls second accumulator 253 and third accumulator 263 according to the comparison signal COMP during an interval P6. That is, when the comparison signal COMP has a high level, controller 241 controls the second accumulator 253 and third accumulator 263 to perform an operation, respectively.

Each of second accumulator 253 and third accumulator 263 performs an accumulation operation under control of controller 241 during an interval P6. Second accumulator 253 includes a multiplier 255, a counter 257, an adder 259 and a delay unit 261. Multiplier 255 multiplies a counter signal n output from counter 257 and an operating signal ry(n).

Adder 259 adds a signal output from mixer 255 and a delay signal delayed by delay unit 261. Delay unit 261 outputs a signal Σnry(n) by delaying an output signal of adder 259. That is, second accumulator 253 outputs a signal Σnry(n) by performing a multiplication operation and an addition operation. Third accumulator 263 includes an adder 265 and a delay unit 267. Adder 265 adds an operating signal ry(n) and a delay signal delayed by delay unit 267. Third accumulator 263 outputs a signal Σry(n) by performing an accumulation operation.

Divider 271 performs an operation, which is expressed as Equation 3, under control of controller 241 during an interval P7.

$$nopt = \frac{\sum nry(n)}{ry(n)} \quad \text{[Equation 3]}$$

The parameter "nopt" indicates the coarse FFT window start position value, the value n indicates an integer, and ry(n) indicates the operating signal, respectively. Accordingly, divider 271 outputs a coarse FFT window start position (C2=nopt) where a signal-to-noise ratio is maximized according to the operation result. An interval P8 indicates a time slot. For example, in some embodiments the interval P8 may be 25 ms.

Figure 8:
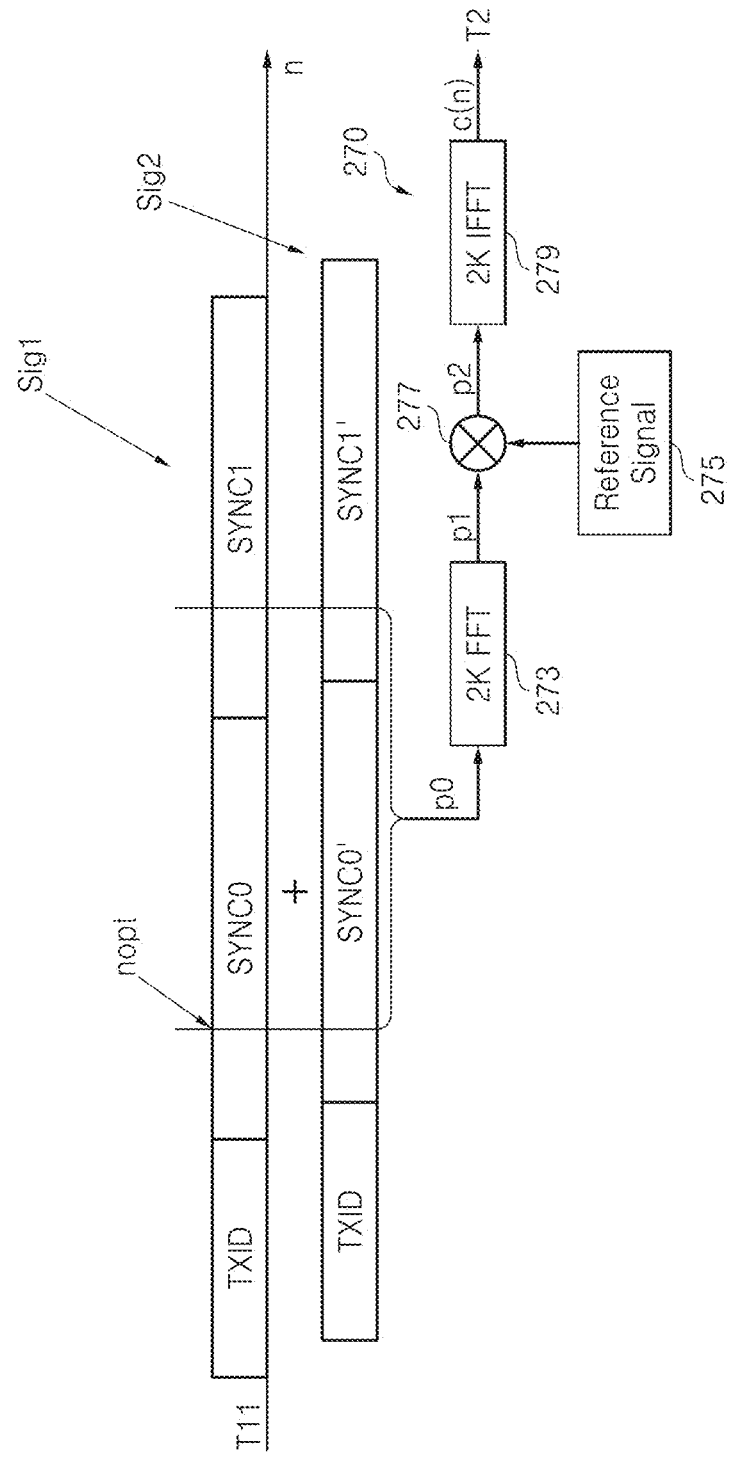
FIG. 8 is a diagram for explaining an operation of a CIR block illustrated in FIG. 4.

FIG. 8 is a diagram for explaining an exemplary operation of CIR block 270 illustrated in FIG. 4. Referring to FIGS. 2, 4 and 8, when transmitter 3 of FIG. 2 transmits a signal Sig1 to receiver 100, a signal Sig2 may be produced by a reflection from obstacle 7.

CIR block 270 generates a channel impulse response signal (c(n)=T2) by performing an FFT operation and an inverse FFT (IFFT) operation on a signal p0 which is produced by adding sync symbols SYNC0 and SYNC1 of the signal Sig1 and sync symbols SYNC0' and SYNC1' of a signal Sig2. CIR block 270 includes an FFT block 273, a multiplier 277 and an IFF block 279. FFT block 273 outputs a signal p1 by performing a FFT operation on a signal p0 which is caused by adding sync symbols SYNC0 and SYNC1 of a signal Sig1 and sync symbols SYNC0' and SYNC1' of a signal Sig2 at a coarse FFT window start position (nopt).

Multiplier 277 outputs a signal p2 by multiplying a signal p1 and a reference signal 275. Reference signal 275 may be stored in a memory (not shown) of receiver 100. IFFT 279 outputs a channel impulse response signal c(n) by performing an IFFT operation on the signal p2.

Figure 9:
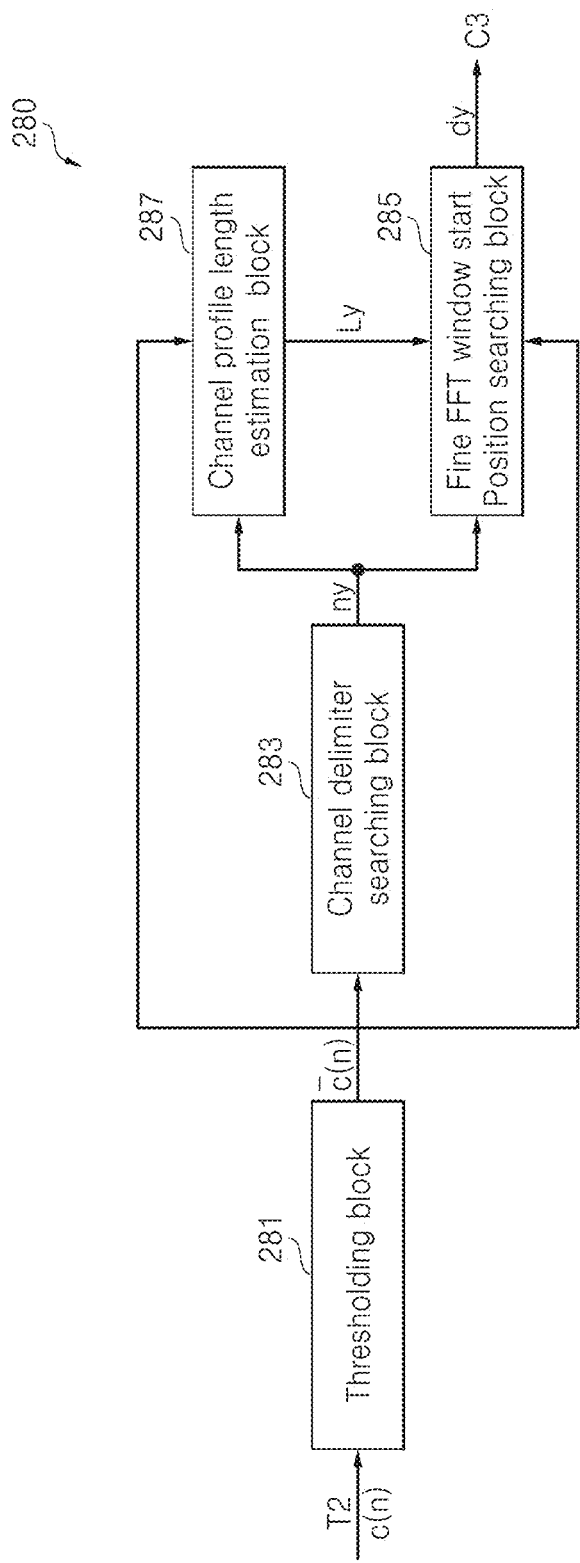
FIG. 9 is a block diagram for explaining an operation of a fine sync block illustrated in FIG. 4.

FIG. 9 is a block diagram for explaining an exemplary operation of fine sync block 280 illustrated in FIG. 4. Referring to FIGS. 4 and 9, a fine sync block 280 includes a thresholding block 281, a channel delimiter searching block 283, and a fine FFT window start position searching block 285.

According to an example embodiment, fine sync block 280 may further include a channel profile length estimation block 287.

Thresholding block 281 receives a channel impulse response signal c(n) and outputs an updated channel impulse response signal c̄(n) by using Equation 4 as shown below.

The channel impulse response signal c(n) is the same as the signal T2 shown in FIG. 4.

$$\bar{c}(n) = c(n), \ |c(n)|^2 > \frac{4}{2048}\sum_{k=0}^{2047}|c(k)|^2 \quad \text{[Equation 4]}$$

0, otherwise

Here, c̄(n) indicates an updated channel impulse response signal, c(n) indicates a channel impulse response signal, and k indicates an integer, respectively. Thresholding block 281 is a simple noise cancellation scheme. All weak samples are cancelled by thresholding block 281.

Figure 10:
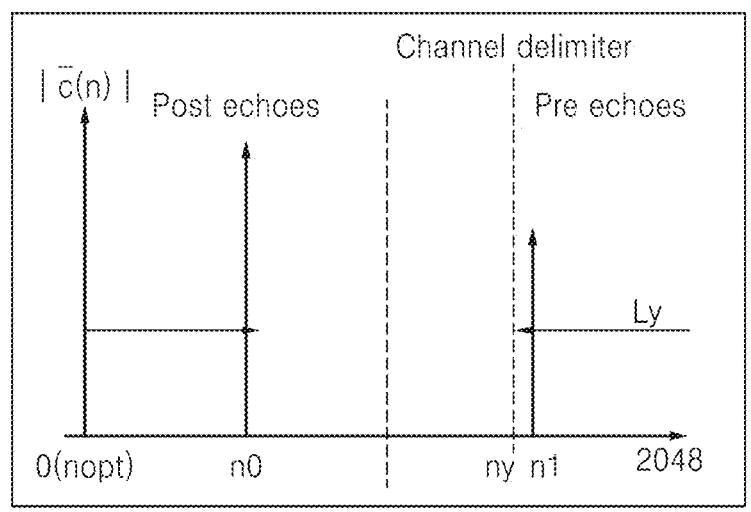
FIG. 10 is a graph for explaining an operation of a channel delimiter searching block illustrated in FIG. 9.

FIG. 10 is a graph for explaining an operation of channel delimiter searching block 283 illustrated in FIG. 9. Referring to FIGS. 4, 9 and 10, channel delimiter searching block 283 searches for a channel delimiter ny in the updated channel impulse response signal c̄(n). The channel delimiter ny may be searched by using Function I below.

$$\left|\sum_{n=0}^{2047}|\bar{c}(n)|^2 n - 2048\sum_{n=ny+1}^{2047}|\bar{c}(n)|^2\right| \quad \text{[Function I]}$$

Here, ny indicates the channel delimiter value such that Function I is minimized by ny, c̄(n) indicates the updated channel impulse response signal, and n indicates the number of samples, respectively.

Fine FFT window start position searching block 285 calculates a fine FFT window start position dy by using Equation 6.

$$\sum_{n=ny}^{dy+ny}|\bar{c}(n\bmod 2048)|^2 = \sum_{n=ny+dy+512}^{2047+ny}|\bar{c}(n\bmod 2048)|^2 \quad \text{[Equation 6]}$$

Here dy indicates the fine FFT window start position value, ny indicates the channel delimiter value, n indicates an integer, and mod 2048 indicates a modulo operation with modulus 2048, respectively.

Referring to FIG. 4, a fine FFT window start position C3 equals a fine FFT window start position dy. Accordingly, adder 290 determines a coarse FFT window start position C2, adjusts or corrects the coarse FFT window start position C2 according to the fine FFT window start position C3 and determines a final FFT window start position C4.

Figure 11:
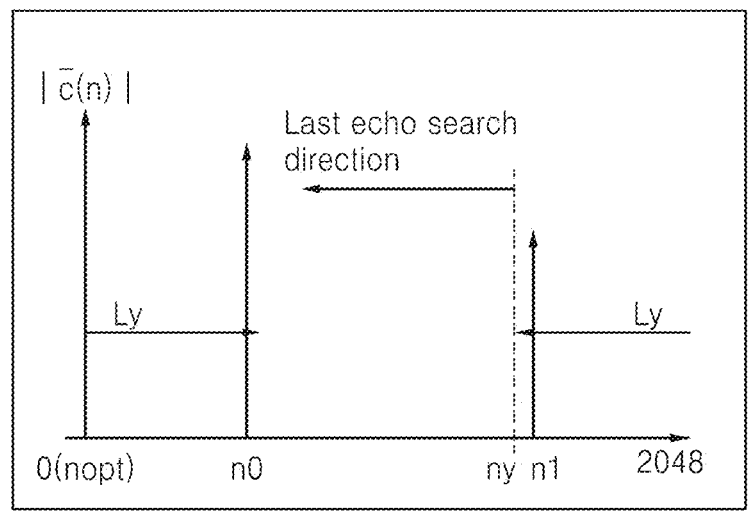
FIG. 11 is a graph for explaining an operation of a channel profile length estimation block illustrated in FIG. 9.

FIG. 11 is a graph for explaining an operation of the channel profile length estimation block 287 illustrated in FIG. 9. Referring to FIGS. 4, 9 and 11, channel profile length estimation block 287 searches for a last echo position index and calculates the channel profile length Ly according to the last echo position index. Equalizer 150 of FIG. 4 performs an equalization operation by using the channel profile length Ly.

Figure 12:
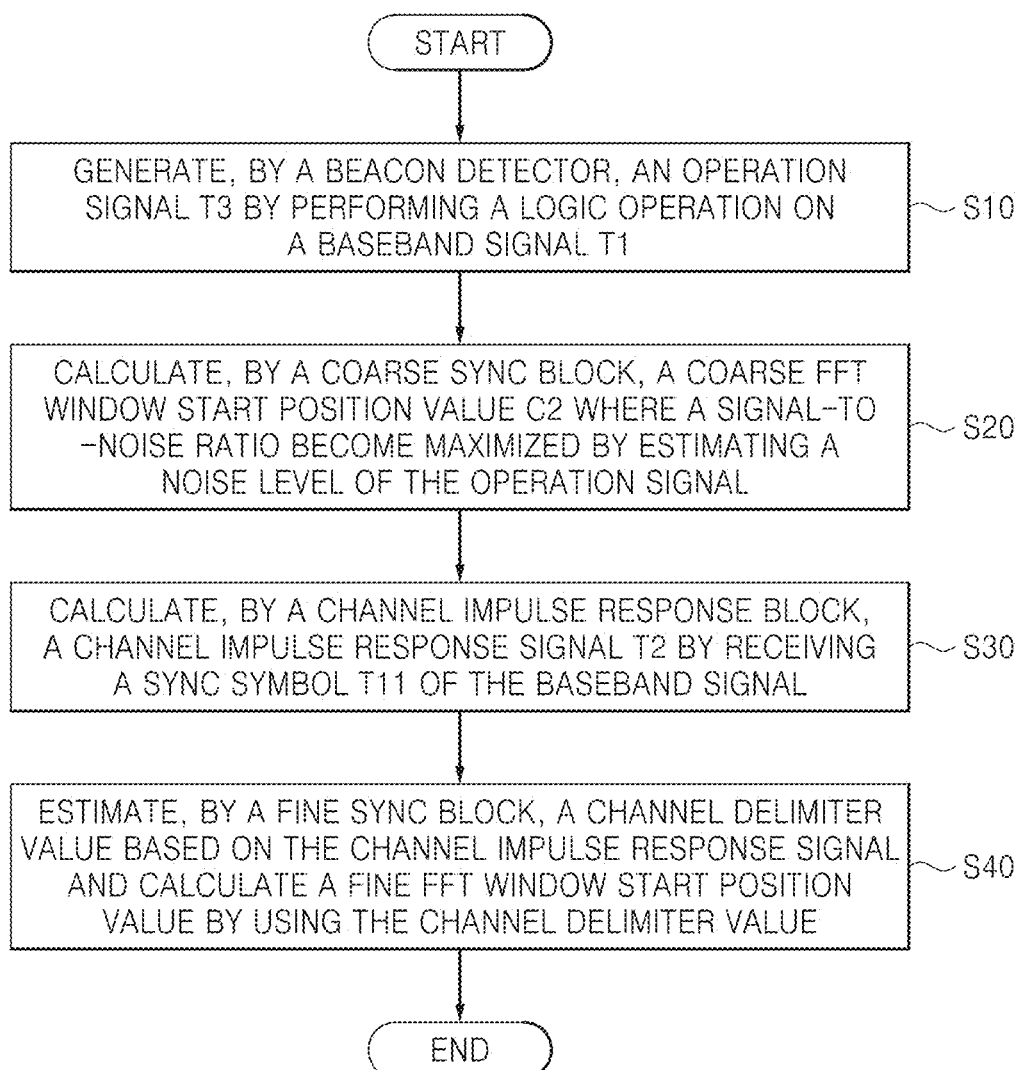
FIG. 12 is a flowchart depicting a method of operating a timing synchronization block illustrated in FIG. 4.

FIG. 12 is a flowchart depicting an operation method of timing synchronization block 200 illustrated in FIG. 4. Referring to FIGS. 1 to 12, beacon detector 210 generates an operating signal ry(n) or T3 by performing a logic operation on a baseband signal T1 (S10).

Coarse sync block 240 calculates a coarse FFT window start position value (C2=nopt) where a signal to noise ratio is maximized by estimating a noise level of an operating signal ry(n) (S20).

Channel impulse response block 270 calculates a channel impulse response signal T2 by receiving a sync symbol T11 of the baseband signal T1 (S30). Fine sync block 280 estimates a channel delimiter value ny based on the channel impulse response signal T2 and calculates a fine FFT window start position value (C3=dy) by using the estimated channel delimiter value (S40).

Figure 13:
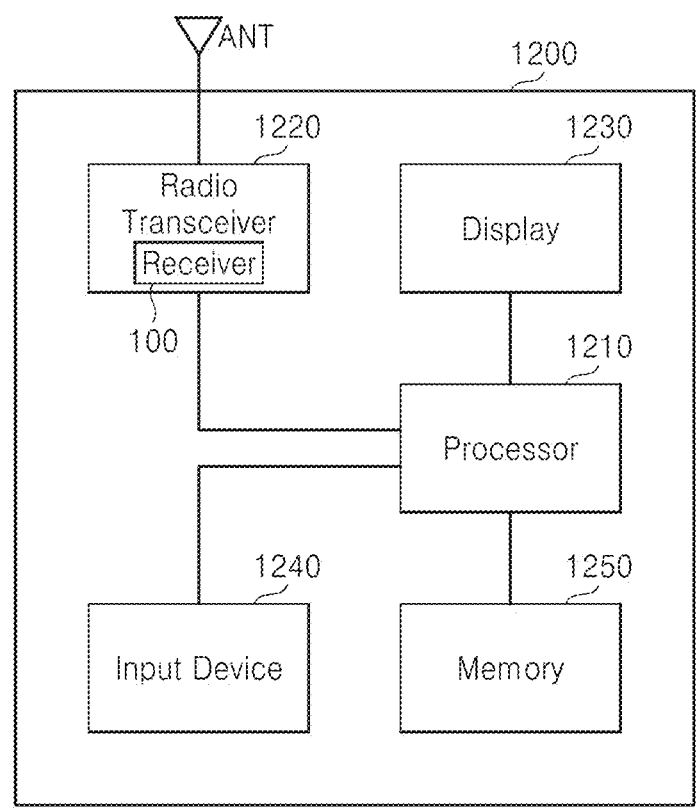
FIG. 13 is an example embodiment of an electronic device including the receiver illustrated in FIG. 4.

FIG. 13 is an example embodiment of an electronic device including the receiver illustrated in FIG. 4. Referring to FIGS. 4 and 13, an electronic device 1200 such as a cellular phone, a smart phone or a tablet PC may include a processor 1210, a radio transceiver 1220 including receiver 100 illustrated in FIG. 4, a display 230 and an input device 1240.

Receiver 100 may receive a signal output from transmitter 3 and perform a synchronization operation on a received signal according to an example embodiment of the inventive concepts. Receiver 100 may convert a signal where a synchronization operation is performed into a signal which processor 1210 may process and display it through display 1230.

In some embodiments, receiver 100 may process a signal in accordance with a china multimedia mobile broadcasting (CMMB) standard.

CMBB is a standard for mobile television and multi-media in China.

Radio transceiver 1220 may transmit or receive a radio signal through an antenna ANT. For example, radio transceiver 1220 may convert a radio signal received through antenna ANT into a signal which processor 1210 may process. Accordingly, processor 1210 may process a signal output from radio transceiver 1220, and store a processed signal in memory 1250 or display it through display 1230.

Radio transceiver 1220 may convert a signal output from processor 1210 into a radio signal and output a converted radio signal to outside through antenna ANT.

Input device 1240, as a device which may input a control signal for controlling an operation of processor 1210 or data to be processed by processor 1210, may be embodied in a pointing device such as a touch pad and a computer mouse, a keypad or a keyboard.

Processor 1210 may control display 1230 so that data output from memory 1250, a radio signal output from radio transceiver 1220 or data output from input device 1240 may be displayed through display 1230.

FIG. 13 illustrates that processor 1210 controls directly an operation of memory 1250; however, electronic device 1200 may further include a memory controller (not shown), which may control an operation of memory 1250 according to a control of processor 1210, according to an example embodiment of the inventive concepts.

Figure 14:
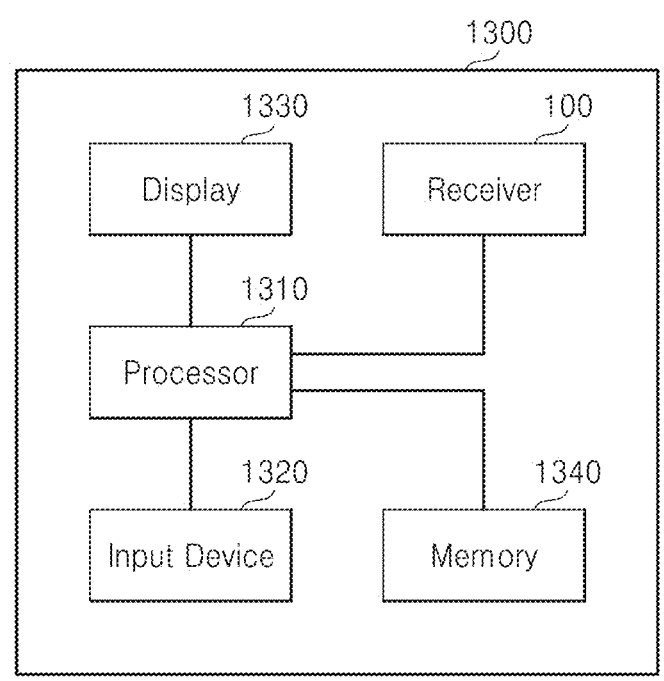
FIG. 14 is another example embodiment of the electronic device including the receiver illustrated in FIG. 4.

FIG. 14 is another example embodiment of an electronic device including receiver 100 illustrated in FIG. 4. Referring to FIGS. 4 and 14, an electronic device 1300, which may be embodied in a data processing device such as a personal computer (PC), a tablet computer, a net-book, an e-reader, a personal digital assistant (PDA), a portable multimedia player (PMP), a MP3 player or a MP4 player, includes a processor 1310, an input device 1320, a display 1330, a memory 1340 and the receiver 100.

Receiver 100 may receive a signal output from transmitter 3 and perform a synchronization operation in accordance with an example embodiment of the inventive concepts on a received signal, convert the signal where a synchronization operation is performed into a signal which processor 1310 may process, and display it through display 1330. Receiver 100 may process a signal in accordance with a china multimedia mobile broadcasting (CMMB) standard.

Processor 1310 may display data stored in memory 1340 through display 1330 according to an input signal generated by input device 1320. For example, input device 1320 may be embodied in a pointing device such as a touch pad or a computer mouse, a keypad or a keyboard.

FIG. 14 illustrates that processor 1310 controls an operation of the memory 1340 directly; however, electronic device 1300 may further include a memory controller (not shown), which may control an operation of memory 1340 according to a control of processor 1310, according to an example embodiment.

A receiver according to an example embodiment of the inventive concepts and an operation method thereof may minimize inter-symbol interference (ISI) by selecting an appropriate FFT window start position, for example s explained above with respect to FIGS. 4-12.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A synchronization method for a receiver, the method comprising:
    generating, by a beacon detector, an operating signal by performing a logic operation on a baseband signal;
    estimating, by a coarse sync block, a noise level of the operating signal to obtain an estimated noise level, and calculating a coarse fast Fourier transform (FFT) window start position value where a signal-to-noise ratio is maximized according to the estimated noise level;
    calculating, by a channel impulse response block, a channel impulse response signal by receiving a sync symbol of the baseband signal; and
    estimating, by a fine sync block, a channel delimiter value based on the channel impulse response signal and calculating a fine FFT window start position value by using the estimated channel delimiter value,
    wherein calculating the fine FFT window start position value further comprises:
    receiving the channel impulse response signal and calculating an updated channel impulse response signal by $$\overline{c}(n) = c(n), |c(n)|^2 > \frac{4}{2048}\sum_{k=0}^{2047}|c(k)|^2, 0, \text{otherwise}$$

wherein $\overline{c}(n)$ indicates the updated channel impulse response signal, $c(n)$ indicates the channel impulse response signal, and k indicates an integer, respectively.

2. The method of claim 1, wherein the channel delimiter value is calculated by $$\left|\sum_{n=0}^{2047}|\overline{c}(n)|^2 n - 2048\sum_{n=ny+1}^{2047}|\overline{c}(n)|^2\right|,$$

wherein the ny is the channel delimiter value and the equation is minimized by ny, $\overline{c}(n)$ indicates the updated channel impulse response signal, and n indicates an integer, respectively.

3. The method of claim 2, wherein the fine FFT window start position value is calculated by $$\sum_{n=ny}^{dy+ny}|\overline{c}(n\bmod 2048)|^2 = \sum_{n=ny+dy+512}^{2047+ny}|\overline{c}(n\bmod 2048)|^2,$$

wherein dy indicates the fine FFT window start position value, ny indicates the channel delimiter value, n indicates an integer, and mod 2048 indicates a modulo operation with a modulus of 2048, respectively.

4. A synchronization method for a receiver, the method comprising:
    generating, by a beacon detector, an operating signal by performing a logic operation on a baseband signal; and
    estimating, by a coarse sync block, a noise level of the operating signal to obtain an estimated noise level, and calculating a coarse fast Fourier transform (FFT) window start position value where a signal-to-noise ratio is maximized according to the estimated noise level, wherein calculating the coarse FFT window start position value comprises:
comparing the operating signal with the estimated noise level; and
calculating the coarse FFT window start position value according to a result of the comparison of the operating signal and the estimated noise level
wherein calculating the coarse FFT window start position value further comprises:
waiting until receiving a sync trigger signal from the beacon detector;
waiting during a first guard interval before estimating the noise level of the operating signal; and
waiting during a second guard interval after estimating the noise level of the operating signal.

5. The method of claim 4, wherein the noise level is calculated by $$Snoise = \frac{1}{Nnoise} \sum ry(n),$$

wherein Snoise indicates the noise level, Nnoise indicates the number of samples, n indicates an integer and ry(n) indicates the operating signal, respectively.

6. The method of claim 4, wherein the coarse FFT window start position value is calculated by $$nopt = \frac{\sum nry(n)}{ry(n)},$$

wherein the nopt indicates the coarse FFT window start position value, n indicates an integer, and ry(n) indicates the operating signal, respectively.

7. A receiver, comprising:
a front end configured to convert a radio frequency signal into a baseband signal;
a beacon detector configured to generate an operating signal by performing a logic operation on the baseband signal;
a coarse sync block configured to estimate a noise level of the operating signal and to calculate a coarse fast Fourier transform (FFT) window start position value, where a signal-to-noise ratio is maximized based on an estimation result; and
a fast Fourier transform (FFT) block configured to convert the baseband signal into a frequency domain signal by using the FFT window start position value,
wherein the coarse sync block comprises:
an accumulator configured to perform an accumulation operation by receiving the operating signal and to estimate the noise level based on an accumulation operation performance result;
a comparator configured to compare the operating signal with the noise level and to output a comparison signal;
a divider configured to calculate the coarse FFT window start position value where a signal-to-noise ratio is maximized by using the noise level of the operating signal; and
a controller configured to control the accumulator and the divider in response to the comparison signal.

8. The receiver of claim 7, further comprising:
a channel impulse response block configured to receive a sync symbol of the baseband signal and to calculate a channel impulse response signal; and
a fine sync block configured to estimate a channel delimiter value in response to the channel impulse response signal and to calculate a fine FFT window start position value based on the channel delimiter value.

9. The receiver of claim 8, wherein the fine sync block comprises:
a channel delimiter searching block configured to search for the channel delimiter value based on the channel impulse response signal; and
a fine FFT window start position searching block configured to calculate the fine FFT window start position value by using the channel delimiter value.

10. The receiver of claim 9, wherein the fine sync block further comprises a thresholding block configured to receive the channel impulse response signal and to output an updated channel impulse response signal.

11. A device, comprising:
a receiver front end configured to receive a wireless signal and to output a baseband signal;
a Fast Fourier Transformer configured to perform a Fast Fourier Transform (FFT) on the baseband signal; and
a timing synchronization unit configured to receive the baseband signal and in response thereto to supply an FFT window start position to the Fast Fourier Transformer, the timing synchronization unit being configured:
to detect one or more sync symbols in the baseband signal and in response thereto to generate a sync trigger signal and an operating signal,
to estimate a noise level of the operating signal and in response thereto to calculate a coarse FFT window start position value,
to generate a channel impulse response signal in response to the baseband signal, wherein the channel impulse response signal corresponds to an impulse response of a channel by which the wireless signal is transmitted to the device,
to determine a channel delimiter value in response to the channel impulse response signal, to calculate a fine FFT window start position value from the channel impulse response signal, and
to adjust the course FFT window start position value with the fine FFT window start position value to determine the FFT window start position,
wherein calculating the coarse FFT window start position value further comprises:
waiting during a first guard interval before estimating the noise level of the operating signal; and
waiting during a second guard interval after estimating the noise level of the operating signal.

12. The device of claim 11, wherein the timing synchronization unit includes a beacon detector configured to detect the sync symbol in the baseband signal and in response thereto to generate the sync trigger signal and the operating signal.

13. The device of claim 11, wherein the timing synchronization unit includes a channel impulse response (CIR) unit configured to generate the channel impulse response signal in response to the baseband signal, wherein the CIR unit comprises:
an FFT unit configured to perform an FFT on the one or more sync symbols of the baseband signal at the coarse FFT window start position value to generate a first frequency domain signal;
a multiplier configured to multiply the frequency domain signal by a reference signal to generate a second frequency domain signal; and an inverse FFT unit configured to perform an inverse FFT on the second frequency domain signal to produce the channel impulse response signal.

14. The device of claim 11, wherein the timing synchronization unit includes a coarse sync block, wherein the coarse sync block is configured:
- to estimate a noise level of the operating signal;
- to compare the operating signal with the estimated noise level; and
- to calculate the coarse FFT window start position value according to a result of the comparison of the operating signal and the estimated noise level.

15. The device of claim 14, wherein the coarse sync block is configured to calculate the coarse FFT window start position value where a signal-to-noise ratio of the baseband signal is maximized.

* * * * *